(12) United States Patent
Goulahsen et al.

(10) Patent No.: US 10,558,587 B2
(45) Date of Patent: Feb. 11, 2020

(54) METHOD AND DEVICE FOR TRANSFER OF DATA TO OR FROM A MEMORY

(71) Applicants: STMicroelectronics (Grenoble 2) SAS, Grenoble (FR); STMicroelectronics (Grand Ouest) SAS, Delarue (FR)

(72) Inventors: Abdelaziz Goulahsen, Coublevie (FR); Patrice Derouet, Teloché (FR)

(73) Assignees: STMICROELECTRONICS (GRAND OUEST) SAS, Delarue (FR); STMICROELECTRONICS (GRENOBLE 2) SAS, Grenoble (FR)

( * ) Notice: Subject to any disclaimer, the term of this patent is extended or adjusted under 35 U.S.C. 154(b) by 272 days.

(21) Appl. No.: 15/444,558

(22) Filed: Feb. 28, 2017

(65) Prior Publication Data
US 2018/0067872 A1 Mar. 8, 2018

(30) Foreign Application Priority Data

Sep. 5, 2016 (FR) ...................... 16 58232

(51) Int. Cl.
*G06F 12/14* (2006.01)
*G06F 21/60* (2013.01)
(52) U.S. Cl.
CPC .......... *G06F 12/1408* (2013.01); *G06F 21/60* (2013.01)
(58) Field of Classification Search
CPC .. G06F 12/1408; G06F 21/1408; G06F 21/60; H04L 9/0656
See application file for complete search history.

(56) References Cited

U.S. PATENT DOCUMENTS

| 8,549,367 B1* | 10/2013 | Sherred | G11C 29/10 380/2 |
| 2008/0098234 A1* | 4/2008 | Driscoll | H04L 9/004 713/189 |
| 2009/0086972 A1 | 4/2009 | Mozak | |
| 2010/0138669 A1* | 6/2010 | Kursawe | G06F 21/10 713/189 |
| 2012/0008782 A1* | 1/2012 | Furukawa | H04L 9/002 380/268 |
| 2013/0262623 A1* | 10/2013 | Nall | G06F 9/5044 709/217 |
| 2016/0078252 A1* | 3/2016 | Chandra | G09C 1/00 713/190 |

FOREIGN PATENT DOCUMENTS

EP 2413305 A1 1/2012

* cited by examiner

*Primary Examiner* — Robert B Leung
*Assistant Examiner* — Carlos M De Jesus Lassala
(74) *Attorney, Agent, or Firm* — Slater Matsil, LLP

(57) ABSTRACT

A method for reading or writing data at an address of a memory is disclosed. The data includes a number of consecutive words that each has a plurality of bits. The words are transferred to or from the memory in synchronization with a clock signal so that each word is transferred in one cycle of the clock signal. The bits are scrambled or unscrambled by applying a logic function to the bits of each word. The logic function is identical for the scrambling and the unscrambling and makes use of a bit-key that is dedicated to the word and is identical for the scrambling and the unscrambling. Each bit-key comes from a pseudo-random series generated based on the address.

23 Claims, 5 Drawing Sheets

METHOD AND DEVICE FOR TRANSFER OF DATA TO OR FROM A MEMORY

CROSS-REFERENCE TO RELATED APPLICATIONS

This application claims priority to French Patent Application No. 1658232, filed on Sep. 5, 2016, which application is hereby incorporated herein by reference.

TECHNICAL FIELD

Various embodiments of the invention and their implementation relate to integrated circuits, in particular to methods and devices for attenuating electromagnetic interference effects during a transfer of data from or to a memory system, such as a double-data-rate memory.

BACKGROUND

The access to double-data-rate (or DDR) memories, such as for example synchronous dynamic RAM memories (SDRAM) with double-data-rate, is generally implemented by a parallel high-data-rate link.

The writing and the reading of data in a DDR memory are usually carried out by the transfer of a group of several words to or from consecutive memory locations, each word being transferred in one cycle of a clock signal.

Each word comprises several bits, generally 16 or 32 bits, and is transferred in one clock cycle over a parallel link comprising as many bit-lines. The transfer (or "burst" according to the term commonly employed) comprises for example 8 consecutive words in BL8 (for 'Burst Length 8') protocol or 16 consecutive words in BL16.

Thus, over any given bit-line of the link, a horizontal pattern may be repeated from one transfer to another, notably in the case of a repeated storing of the same data.

Such a horizontal repetition, in other words a repetition of the same pattern over a bit-line of the link, may generate, by resonance, abrupt increases in the spectral density of power radiated by the high-data-rate parallel link.

Owing to the high data transfer frequencies implemented in DDR memories, these energy spikes can cause electromagnetic interference (or EMI) effects at frequencies used by neighboring electronic systems, such as usually a radiofrequency telecommunications antenna, for example of the Wi-Fi type, or any other system.

The current solutions for attenuating EMI effects have the drawbacks of reducing the transmission performance characteristics, such as for example the 'slew rate' control, of only being effective for the clock signals, such as for example 'spread spectrum' techniques, or else of being costly to produce, such as for example electromagnetic shielding.

A solution for scrambling transferred data, aimed at reducing the variations in the power supply by vertically scrambling the bits of each word according to a balanced distribution of "0"s and of "1"s has been provided in the Patent application US 2009/0086972 A1, but does not address the problem of electromagnetic interference effects generated by a horizontal repetition of a pattern of data.

SUMMARY

It is for this reason that, according to various embodiments and their implementation, a solution is provided that is simple, effective and inexpensive for attenuating the electromagnetic interference effects coming from such an origin.

According to one aspect, a method is provided for writing or for reading data at an address in a memory. The data comprises several consecutive words each having several bits. The method comprises a transfer of the words to or from the memory at the cadence of a clock signal. Each word is transferred in one cycle of the clock signal. The bits of the words are scrambled or unscrambled by applying a first logic function to the bits of each word. The first logic function identical for the scrambling and the unscrambling. The method makes use of a bit-key dedicated to the word and identical for the scrambling and the unscrambling. Each bit-key comes from a pseudo-random series generated based on the address.

A scrambling is applied upon writing and an unscrambling upon reading. However, as the same first logic function and the same bit-keys are used during the scrambling and during the unscrambling, the unscrambling is equivalent to a scrambling.

In other words, a scrambling/unscrambling is applied horizontally to the bit-lines of the parallel link, using as root the address in which the data values are written or read, advantageously obviating any modification of the design of the memory or of the read and write requests for implementing the scrambling attenuating the electromagnetic interference effects.

The horizontal scrambling, obtained by the application of a first logic function making use of a bit-key dedicated to each word, allows the electromagnetic interference effects coming from a horizontal repetition of a pattern of data to be limited. Indeed, according to this aspect, the bits transferred consecutively over a line are not correlated with one another.

Thus, in more than 90% of the cases in BL8 and in BL16, the energy peaks interfering in the cellular telecommunications channels may be attenuated by over 20 dB, and, in 100% of the cases in BL16, the energy peaks interfering in the 5 Ghz Wi-Fi channel may be attenuated by over 20 dB.

According to one embodiment, an EXCLUSIVE OR function is used as first logic function.

Being involutive, the EXCLUSIVE OR function of a variable with a parameter is advantageously employed with the address used in the write and read operations as parameter, in order for the implementation of the unscrambling of the process of reading the data to be rigorously identical to the implementation of the scrambling of the process of writing the data.

According to one embodiment, the method comprises an application of a second logic function to the bits of the address in such a manner as to obtain an initialization word, and the pseudo-random series is generated by a shift register with parallelized linear feedback and initialized with the initialization word, the size of the initialization word being equal to the polynomial size of the shift register with parallelized linear feedback.

Indeed, it may be advantageous for the polynomial size of the linear feedback shift register to be smaller than the size of the address, notably in order to minimize the maximum possible sequence of identical bits.

Thus, the size of the initialization word is advantageously smaller than the size of the address.

In this regard, the second logic function is for example an EXCLUSIVE OR logic function applied between a first group of bits and a second group of bits of the address.

For example, the most-significant bits, i.e. the half of the bits composing the address that are the most significant, form the first group of bits, and the least-significant bits, i.e. the half of the bits composing the address that are the least significant, form the second group of bits.

Furthermore, it is possible that, at a given linear feedback shift register and at a given initialization word, the pseudo-random series generated is, in its first terms, the same as for another initialization word. Thus, it is advantageous, according to one embodiment, to apply feedback to the linear feedback shift register over its whole length prior to using its terms as bit-keys.

In other words, the bit-keys advantageously come from the terms of the pseudo-random series which have a rank greater than the size of the initialization word.

The parallelization of the linear feedback shift register advantageously allows the terms of the pseudo-random series to be simultaneously calculated, instead of the recursive calculation of the terms of a usual serial design.

However, owing to a potential complexity of the parallelization, the calculation of certain terms of the pseudo-random series may require going through logic gates which may be unfeasible in a single clock cycle.

Thus, the generation of at least the bit-key dedicated to the first word transferred is advantageously carried out during the cycle of the clock signal directly preceding the cycle of the clock signal during which the word to which it is dedicated is transferred.

Moreover, the generation of at least one bit-key dedicated to a word which is not the first transferred may be carried out over several cycles of the clock signal preceding the clock cycle during which the word to which it is dedicated is transferred.

According to another aspect, a device comprises a transfer circuit configured for writing or reading data in a location of a memory having an address. The data comprises several consecutive words each having several bits. The reading or writing is performed by transferring the words to or from the memory at the cadence of a clock signal. Each word is transferred in one cycle of the clock signal. The device also comprises scrambling/unscrambling circuitry comprising a signal generator configured for generating a pseudo-random series based on the address, and a first logic circuit configured for applying a first logic function to the plurality of bits of each word with a bit-key respectively dedicated to each word and coming from the pseudo-random series.

According to one embodiment, the first logic circuit is configured for applying a first logic EXCLUSIVE OR function.

According to one embodiment, the device comprises a second logic circuit configured for applying a second logic function to the bits of the address in such a manner as to obtain an initialization word, and in which the signal generator comprises a shift register with parallelized linear feedback configured so as to be initialized with the initialization word, the size of the initialization word being equal to the polynomial size of the shift register with parallelized linear feedback.

Advantageously, the size of the initialization word is smaller than the size of the address.

According to one embodiment, the second logic function is an EXCLUSIVE OR applied bit-to-bit between a first group of bits and a second group of bits of the address, for example between the most-significant bits and the least-significant bits of the address.

The bit-keys are advantageously produced from terms of the pseudo-random series having a rank greater than the size of the initialization word.

Advantageously, the scrambling circuitry is configured for generating at least the bit-key dedicated to the first word of the data transferred during the cycle of the clock signal directly preceding the cycle of the clock signal during which the word to which it is dedicated is transferred.

Furthermore, the scrambling circuitry may be configured for generating at least one bit-key dedicated to a word of the data which is not the first word transferred, over several cycles of the clock signal preceding the cycle of the clock signal during which the word to which it is dedicated is transferred.

The device may advantageously be incorporated in an integrated manner into a system-on-a-chip.

The device can be included within a system furthermore comprising a memory. The transfer circuit is capable of reading or writing in the memory.

The memory of the system is advantageously a memory of the double-data-rate type.

BRIEF DESCRIPTION OF THE DRAWINGS

Others advantages and features of the invention will become apparent upon detailed examination of non-limiting embodiments and their implementation and from the appended drawings in which.

DETAILED DESCRIPTION OF ILLUSTRATIVE EMBODIMENTS

Figure 1:
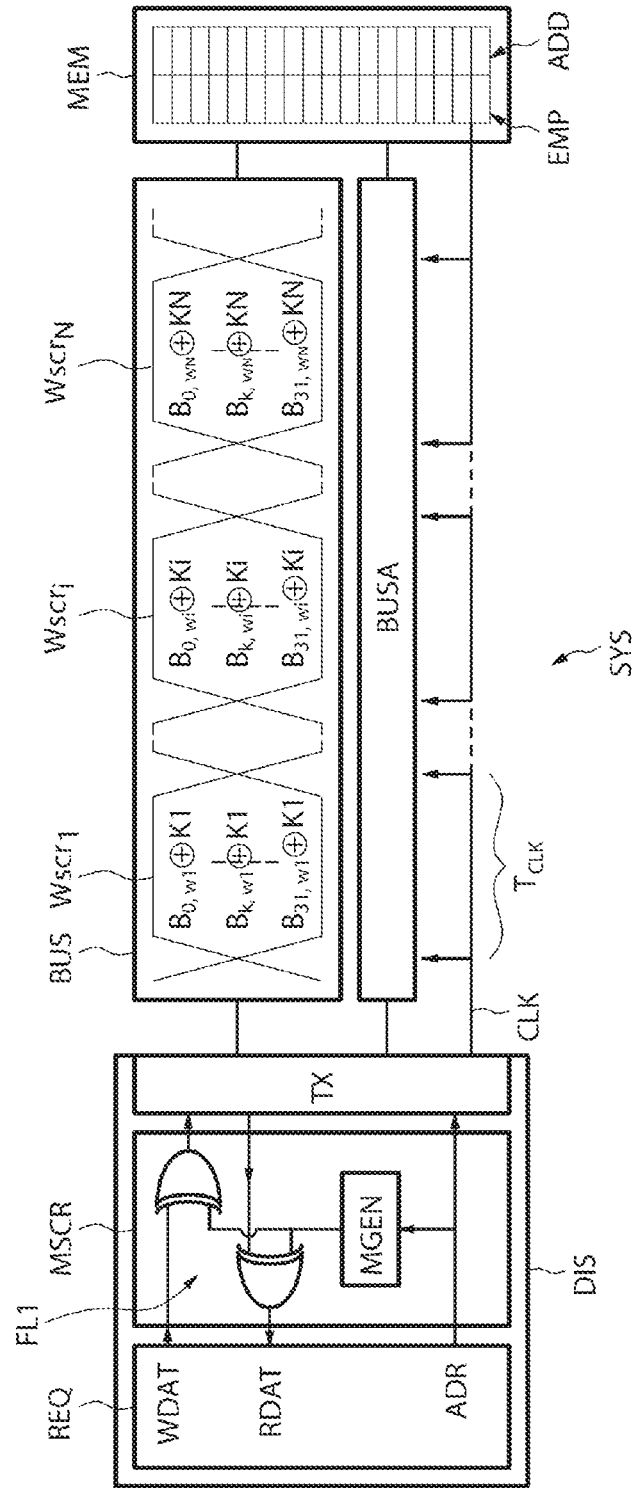
FIGS. 1 to 6 show embodiments of the invention and their implementation.

FIG. 1 illustrates one example of a system SYS comprising a system-on-a-chip device DIS notably comprising scrambling circuitry MSCR and a transfer stage TX configured for communicating with a double-data-rate memory MEM, notably via a high-data-rate parallel link BUS.

The scrambling circuitry MSCR is configured for scrambling or unscrambling the data to be written or to be read at a memory location EMP having an address ADD, and comprises a signal generator MGEN and a first logic circuit $FL_1$.

For simplicity, the term "address" in the following will denote both the address of a memory location and the memory location itself, such as for example in the expression "writing to an address."

The data to be transferred are organized into words $W_i$ (the non-scrambled words $W_i$ are not shown in this figure), with $1 \leq i \leq N$, N depending on the protocol used, for example N=16. The words may for example comprise 32 bits each, and are transferred consecutively at each cycle $T_{CLK}$ of a clock signal CLK, in order to be consecutively written or read to or from an address ADR in the memory MEM.

A bit of a word $W_i$ is referenced $B_{k,\overline{w_i}}$, with k, $1 \leq k \leq 32$ in this example, the position or the significance of the bit $B_{k,\overline{w_i}}$ within the word $W_i$.

The read or write address may for example comprise 32 bits, and is transferred between the memory MEM and the device DIS via a parallel link with address BUSA.

Various modules or devices REQ of the system DIS may require the writing WDAT or the reading RDAT of data at an address ADR, in a conventional manner known per se.

When there is a request to write at an address ADR, the signal generator MGEN generates a pseudo-random series obtained from the address ADR, and the first logic circuit FL1 scrambles the data to be written at this address ADR by the application of an EXCLUSIVE OR function between the bits $B_{k,Wi}$ and bit-keys Ki ($1 \leq i \leq N$) coming from the terms of the pseudo-random series.

Each bit-key Ki is dedicated to a non-scrambled memory word Wi and is applied to all the bits $(B_{k,Wi})_{1 \leq k \leq 32}$ of the word, and thus the transferred data is composed of scrambled bits, denoted $B_{k,Wi} \oplus Ki$, with $1 \leq k \leq 32$ and $1 \leq i \leq N$.

When there is a request to read at the same address ADR, the signal generator MGEN generates the same pseudo-random series obtained from the address ADR and the first logic circuit FL1 applies the same logic function with the same bit-key Ki dedicated to a word Wi.

Thus, in a read operation, the initial data values are reconstructed by involution, $B_{k,Wi} \oplus Ki \oplus Ki = B_{k,Wi}$.

Figure 2:
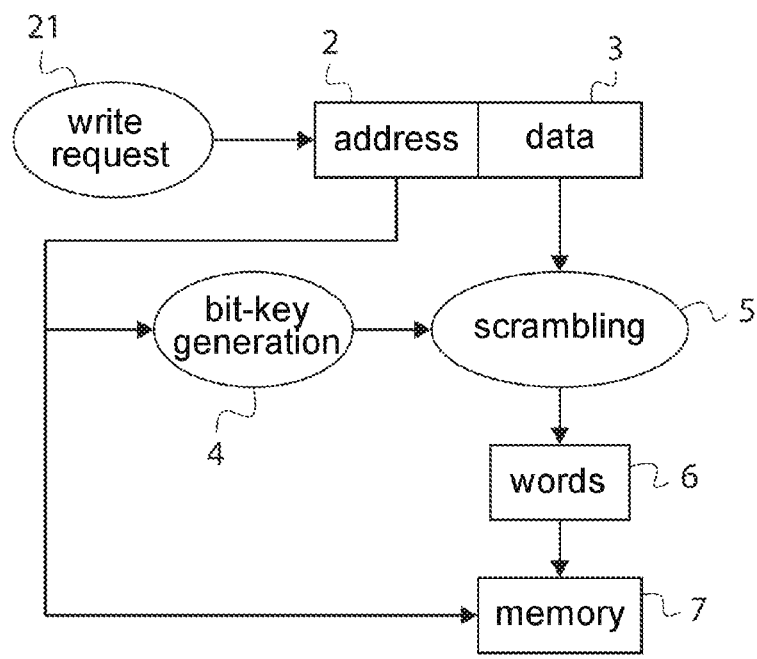

In other words, as shown in FIG. 2, when there is a request for writing 21, conventionally supplying an address 2 and data 3, bit-keys are generated (4) from the address in order to scramble (5) the data and transfer it via consecutive words 6 to the address of the memory 7.

Figure 3:
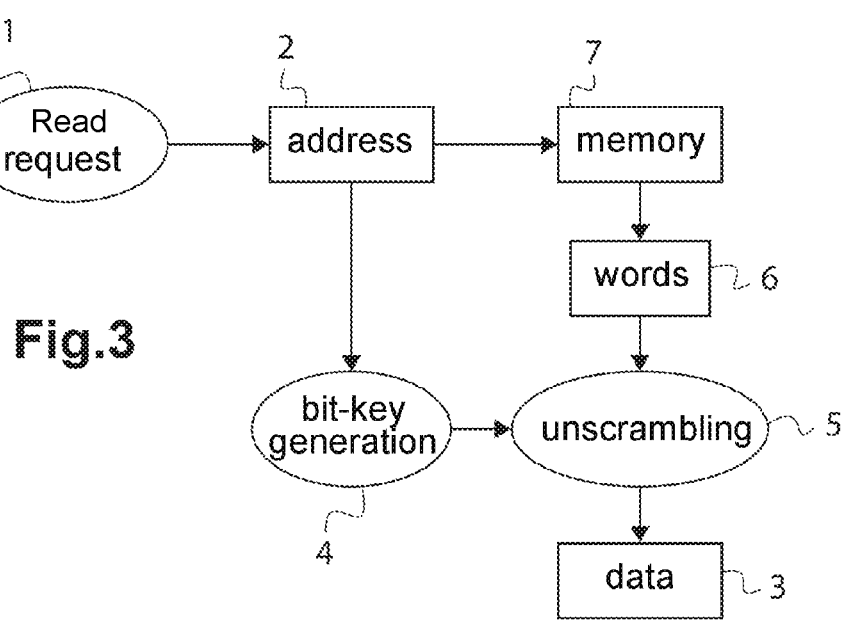

Subsequently, as shown in FIG. 3, when there is a read request 31, an address 2 is supplied, words 6 are consecutively transferred coming from the memory 7 from the address, and the data 3 is reconstructed by virtue of the involutive scrambling process (5) implemented with the bit-keys generated (4) from the address.

In another embodiment, the scrambling can be performed before the transferring and the unscrambling can be performed after the transferring. This method can be useful when it is desired to store unscrambled data in the memory, e.g., for a shared memory.

Figure 4:
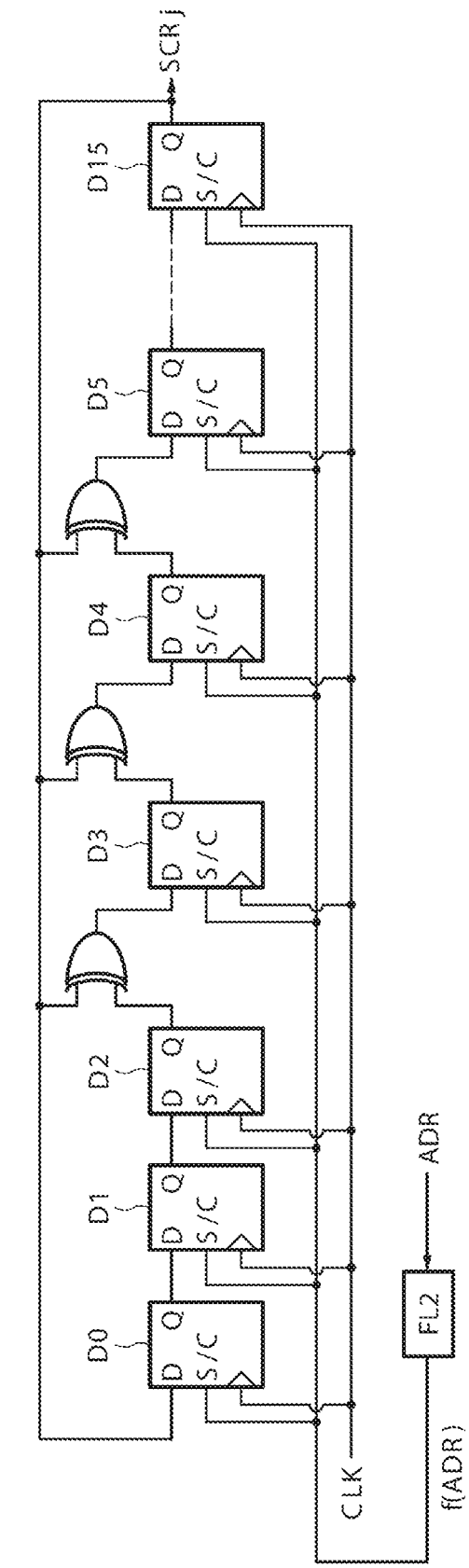

FIG. 4 shows one example of a linear feedback shift register RGD1.

The signal generator MGEN may conventionally comprise the serial linear feedback shift register (or LFSR) RGD1.

In this example, the register RGD1 comprises sixteen shift registers of the flip-flop type D in series, D0-D15, and whose linear feedback is effected between the output of the flip-flop D15 and the inputs of the flip-flops D3, D4 and D5 by means of EXCLUSIVE OR gates.

Thus, this register RGD1 has a polynomial size 16 and connection coefficients 3, 4 and 5.

The flip-flops D0-D15 of the register RGD1 may be initialized by an initialization word f(ADR) with a size equal to its polynomial size.

In operation, the register RGD1 outputs, on the output of the flip-flop D15, a signal SCRj representing the term of rank j of a pseudo-random series generated recursively at each clock cycle of the signal CLK.

For the same initialization, any series $(SCRj)_{j \geq 0}$ generated is identical, and in addition, starting from a sufficiently high rank, the terms of the series at "1" and at "0" have a uniform distribution and are uncorrelated.

Thus, according to one embodiment in which the size of the address ADR and the polynomial size of the register RGD1 are equal, the address ADR may be used as initialization word f(ADR).

However, notably in the case where the least-significant bits of an address ADR are all at "0", the first terms generated by the register RGD1 shown in FIG. 4 for example will not be "mixed".

This is why it is advantageous to apply feedback to the register RGD1 over its whole length, in other words "empty" the register RGD1, prior to using its terms as bit-keys.

The bit-keys thus come from the terms of the pseudo-random series which have a rank greater than the length of the register RGD1, either its polynomial size or else the size of the initialization word.

On the other hand, if the address ADR and the polynomial characteristic of the register RGD1 are of different sizes, then the flip-flops D0-D15 of the register RGD1 are initialized with an initialization word f(ADR) resulting from a second logic function FL2 applied to the bits of the address ADR, and with a size equal to the polynomial size of the register RGD1.

The addresses ADR of double-date-rate memories may be written over 32 bits, for example.

However, one preferred embodiment of the register RGD1 has a polynomial size of 16. This notably allows the maximum possible sequence of identical bits, which is directly proportional to the polynomial size of the register RGD1, to be limited.

In such a configuration, an EXCLUSIVE OR function is advantageously used as second logic function FL2 applied bit-to-bit between the sixteen most-significant bits and the sixteen least-significant bits of the address ADR.

Figure 5:
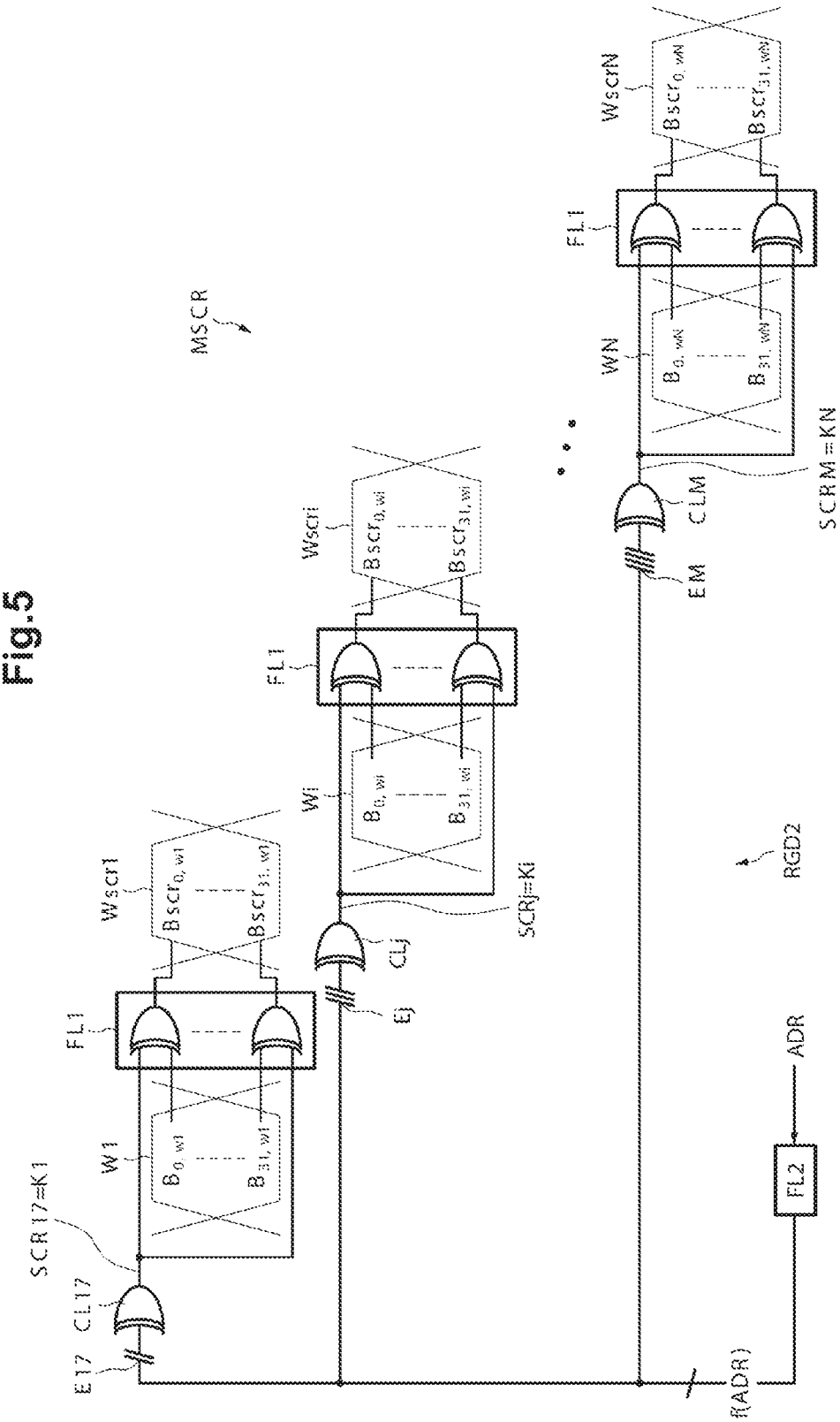

FIG. 5 shows schematically one preferred embodiment of the scrambling circuitry MSCR, in which the signal generator MGEN comprises a shift register with parallelized linear feedback RGD2.

The parallelization of a linear feedback shift register consists in designing logic circuits CLj configured, with a given initialization word f(ADR) on their inputs, for respectively outputting the signal SCRj corresponding to the term of rank j, or $j^{th}$ term, of the pseudo-random series generated by a given conventional serial linear feedback shift register, for example the register RGD1 previously described in relation with FIG. 4, initialized with the same initialization word f(ADR).

Since each term SCRj of the series is calculated by a dedicated logic circuit CLj, the parallelization allows terms of the pseudo-random series to be simultaneously calculated.

Thus, the parallelization of a linear feedback shift register avoids having to wait for the $j^{th}$ clock cycle in order to obtain the $j^{th}$ term of the pseudo-random series of this LFSR, which notably allows the terms $(SCRj)_{T < j \leq T+N}$ to be immediately generated, with T the polynomial size of the LFSR and N the number of consecutive words of a data transfer, without having to "empty" a serial linear feedback shift register requiring T unused clock cycles.

Thus, a logic circuit CL17 receives at its input a combination E17 of bits of the initialization word f(ADR), and outputs a first bit-key K1 corresponding to the $17^{th}$ term SCR17 of the pseudo-random series $(SCRj)_j$.

This first bit-key K1 is used for scrambling the 32 bits of the first word W1 of a data transfer, by the application of a first logic EXCLUSIVE OR function FL1.

Similarly, a logic circuit CLj receives a combination Ej of bits of the initialization word f(ADR) at its input, and outputs a bit-key Ki dedicated to the word Wi with, in this example, j=T+i, corresponding to the $j^{th}$ term SCRj of the pseudo-random series $(SCRj)_j$ and used for scrambling the 32 bits of the second word Wi of the data transfer, by the application of a first logic EXCLUSIVE OR function FL1.

By way of example, in FIG. 5, M=T+N, EM denotes the combination of bits of the initialization word f(ADR) at the input of the logic circuit CLM corresponding to the word WN.

In other words, each word Wi, with 1≤i≤N, is scrambled by a respective bit-key Ki, forming a scrambled word denoted Wscri, with 1≤i≤N respectively.

Thus, the scrambling according to the invention consists, in this example, in forming an series that is irregular and uncorrelated between the bits $Bscr_{k,m}$ of the consecutive scrambled words Wscri of a data transfer, for any fixed k and 1≤i≤N.

Indeed, the terms of the pseudo-random series thus generated are not correlated with one another, and thus the application of the first logic EXCLUSIVE OR function allows transferred data to be obtained whose bits are horizontally uncorrelated. As a consequence, a horizontal pattern cannot repeat itself during a data transfer and the potential electromagnetic interference effects coming from the high-data-rate parallel link are attenuated.

Figure 6:
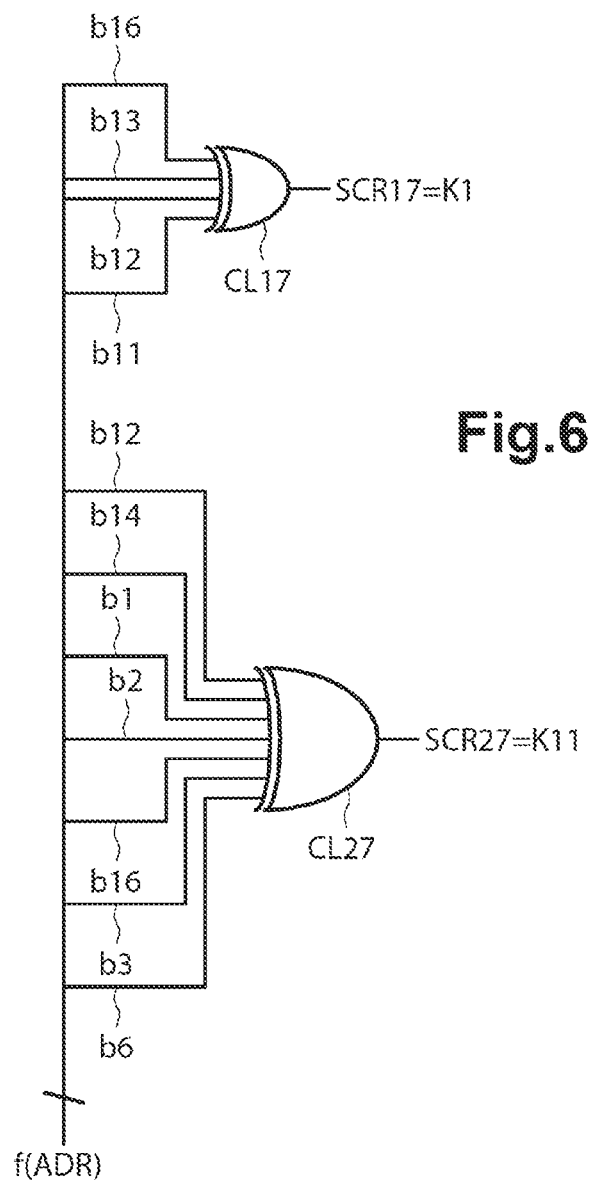

FIG. 6 shows, in more detail, the logic circuits CL17 and CL27 of a parallelized configuration of the register RGD1 described in relation to FIG. 4, respectively generating the terms SCR17 and SCR27 of the pseudo-random series obtained with the register RGD1.

It is recalled that the bit-keys Ki preferably come from the terms of the pseudo-random series generated by the register RGD1 which have a rank greater than the polynomial size T of the register RGD1, i.e. here T=16. Thus, the bit-keys Ki correspond to the terms SCR(16+i) of the pseudo-random series.

The logic circuit CL17, which generates the bit-key K1 dedicated to the first word W1, is an association of three EXCLUSIVE OR gates between the $16^{th}$, $13^{th}$, $12^{th}$ and $11^{th}$ bits of the initialization word f(ADR) and the result of this association is equivalent to the term of rank 17 SCR17 of the pseudo-random series generated by the register RGD1 initialized with the same initialization word f(ADR), whatever it is.

In a homologous manner, the logic circuit CL27 which generates the bit-key K11 dedicated to the eleventh word W11 is an association of six EXCLUSIVE OR gates between the $12^{th}$, $14^{th}$, $1^{st}$, $2^{nd}$, $16^{th}$, $3^{rd}$ and $6^{th}$ bits of the initialization word f(ADR) and the result of this association is equivalent to the term of rank 27 SCR27 of the pseudo-random series generated by the register RGD1 initialized with the same initialization word f(ADR), whatever it is.

Depending, for example, on the processing capacities of the system-on-a-chip DIS comprising the scrambling circuitry MSCR, the generation of the bit-key K11 dedicated to the eleventh word W11, implementing notably the passage through six EXCLUSIVE OR gates, runs the risk of not being achievable in one cycle of the clock signal.

As a consequence, the generation of this dedicated bit-key K11 may be carried out over several cycles of the clock signal, by pre-emption, prior to the cycle of the clock signal during which the eleventh word W11, to which it is dedicated, is transferred.

This notably allows for example a calculation error or a need for a latency time for transferring the scrambled data to the memory or communicating the required reconstructed data to be avoided.

For this purpose, the parallelization is advantageously arranged in such a manner that the first bit-key K1 can be calculated within a single clock cycle, in order to minimize the latency time due to this calculation, just prior to transferring the first word W1.

The other bit-keys may be calculated during the cycle of the clock signal directly preceding the transfer of the word to which it is dedicated, or by pre-emption, according to needs.

In other words, the generation of at least the bit-key dedicated to the first word transferred is advantageously carried out during the cycle of the clock signal directly preceding the cycle of the clock signal during which the word to which it is dedicated is transferred.

Generally speaking, it is possible to use the address ADR itself as initialization word f(ADR) if it has a size equal to the polynomial size of the linear feedback shift register, or else the result of a second logic function on the address ADR, configured so that the result has a size equal to the polynomial size.

One preferred example of such a second logic function is the application of an EXCLUSIVE OR function bit-to-bit between the most-significant bits and the least-significant bits of the address. For example, the most-significant bits are the half of the bits composing the address which are the most-significant, and the least-significant bits are the half of the bits composing the address which are the least-significant, other combinations being nevertheless possible.

Those skilled in the art will be able to adapt the invention to various configurations, such as variations of the number of consecutive words in a data transfer, for example 8 or 16, the polynomial size of a linear feedback shift register, for example 8 or 16, the number of bits comprised by a word, for example 16, 32 or 64, and the size of the address, for example over 16, 24 or 32 bits, together with the nature of the second logic function depending on these various sizes.

Similarly, the invention is not limited to a data transfer to a DDR memory, but may be applied to any memory and, more generally, to any data transfer carried out via a high-data-rate parallel link.

What is claimed is:

1. A method for reading or writing data at an address of a memory, the data comprising a plurality of consecutive words that each have a plurality of bits, the method comprising:

transferring the words to or from the memory in synchronization with a clock signal that has a plurality of clock cycles, each word being transferred in one cycle of the clock signal; and scrambling or unscrambling the bits of the words by applying a first logic function to the bits of each word, wherein the first logic function is identical for the scrambling and the unscrambling and makes use of a bit-key that is dedicated to the word and is identical for the scrambling and the unscrambling, each bit-key coming from a pseudo-random series generated based on the address, wherein each bit-key is a single bit key, and wherein each bit-key is used to scramble or unscramble the plurality of bits of respective consecutive words of the plurality of consecutive words.

2. The method according to claim 1, wherein the first logic function comprises an EXCLUSIVE OR function.

3. The method according to claim 1, further comprising applying a second logic function to the bits of the address in such a manner as to obtain an initialization word, wherein the pseudo-random series is generated by a shift register with parallelized linear feedback and initialized with the initialization word, the initialization word having a size that is equal to a polynomial size of the shift register with parallelized linear feedback.

4. The method according to claim 3, wherein the size of the initialization word is smaller than the size of the address.

5. The method according to claim 3, wherein the second logic function is an EXCLUSIVE OR logic function applied bit-to-bit between a first group of bits and a second group of bits of the address.

6. The method according to claim 3, wherein the bit-keys come from terms of the pseudo-random series that have a rank greater than the size of the initialization word.

7. The method according to claim 1, wherein a bit-key dedicated to a first word transferred is carried out during a cycle of the clock signal directly preceding the cycle of the clock signal during which the first word is transferred.

8. The method according to claim 7, wherein a bit-key dedicated to a second word that is not the first word transferred is carried out over a plurality of cycles of the clock signal preceding the clock cycle during which the second word is transferred.

9. The method according to claim 1, wherein the scrambling or unscrambling comprises scrambling the bits prior to the transferring and unscrambling the bits subsequent to the transferring.

10. A device comprising:
a transfer circuit configured to read or write data in a location of a memory having an address, the data comprising a plurality of consecutive words that each have a plurality of bits, wherein the transfer circuit is configured to read or write the data by transferring the words to or from the memory synchronized with a clock signal so that each word is transferred in one cycle of the clock signal;
scrambling/unscrambling circuitry comprising a signal generator configured to generate a pseudo-random series based on the address; and
a first logic circuit configured to apply a first logic function to the plurality of bits of each word with a bit-key respectively dedicated to a respective word, the bit-key being derived from the pseudo-random series, wherein each bit-key is a single bit key, and wherein each bit-key is configured to be used to scramble or unscramble the plurality of bits of respective consecutive words of the plurality of consecutive words.

11. The device according to claim 10, wherein the first logic circuit is configured to apply an EXCLUSIVE OR logic function.

12. The device according to claim 11, further comprising a second logic circuit configured to apply a second logic function to the bits of the address in such a manner as to obtain an initialization word, wherein the signal generator comprises a shift register with parallelized linear feedback configured so as to be initialized with the initialization word, a size of the initialization word being equal to a polynomial size of the shift register with parallelized linear feedback.

13. The device according to claim 12, wherein the size of the initialization word is smaller than a size of the address.

14. The device according to claim 12, wherein the second logic function is an EXCLUSIVE OR designed to be applied bit-to-bit between a first group of bits and a second group of bits of the address.

15. The device according to claim 12, wherein the bit-keys are produced from terms of the pseudo-random series having a rank greater than the size of the initialization word.

16. The device according to claim 10, wherein the scrambling/unscrambling circuitry is configured to generate a bit-key dedicated to a first word of the data transferred during a cycle of the clock signal directly preceding a cycle of the clock signal during which the first word is transferred.

17. The device according to claim 16, wherein the scrambling/unscrambling circuitry is configured to generate a bit-key dedicated to a word of the data, which is not the first word transferred, over several cycles of the clock signal preceding the cycle of the clock signal during which the word to which it is dedicated is transferred.

18. The device according to claim 10, wherein the device is integrated into a system-on-a-chip.

19. A system comprising:
the device according to claim 10; and
a memory, the transfer circuit of the device being coupled to transfer data to and from the memory.

20. The system according to claim 19, wherein the memory comprises a double-data-rate memory.

21. A method of operating a memory, the method comprising:
scrambling bits of a plurality of consecutive words by applying a first logic function to the bits of each word, wherein the first logic function makes use of an associated bit-key that is dedicated to an associated word, each bit-key coming from a pseudo-random series generated based on an address associated with the associated word;
sending the scrambled bits of each of the plurality of consecutive words to the memory in synchronization with a clock signal, each word being transferred in one cycle of the clock signal; and
storing the scrambled bits of each of the plurality of consecutive words in the memory, wherein each bit-key is a single bit key, and wherein each bit-key is used to scramble or unscramble the bits of respective consecutive words of the plurality of consecutive words.

22. The method according to claim 21, further comprising:
receiving the scrambled bits of each of the plurality of consecutive words from the memory in synchronization with the clock signal, each word being transferred in one cycle of the clock signal; and
unscrambling the bits of the words by applying the first logic function to the bits of each word, wherein the first logic function is identical for the scrambling and the unscrambling and wherein the first logic function makes use of the associated bit-key that is dedicated to the associated word, each associated bit-key being identical for the scrambling and the unscrambling.

23. The method according to claim 21, further comprising generating the pseudo-random series using a shift register with parallelized linear feedback, the pseudo-random series being initialized with an initialization word based on the address.

* * * * *